United States Patent [19]

Smola

[11] Patent Number: 4,741,362

[45] Date of Patent: May 3, 1988

[54] FUEL TANK FOR AN OFF-ROAD VEHICLE

[75] Inventor: Robert J. Smola, Watertown, Wis.

[73] Assignee: Deere & Company, Moline, Ill.

[21] Appl. No.: 898,471

[22] Filed: Aug. 20, 1986

[51] Int. Cl.⁴ .............................................. F16K 24/00
[52] U.S. Cl. .................................... 137/587; 137/590; 73/295; 280/5 A; 220/DIG. 27
[58] Field of Search .................. 137/587, 590; 73/295; 280/5 A; 220/85 F, DIG. 27, DIG. 33

[56] References Cited

U.S. PATENT DOCUMENTS

| | | | |
|---|---|---|---|
| 1,405,147 | 1/1922 | Mueller | 137/587 X |
| 2,335,694 | 11/1943 | Paquin et al. | 137/587 X |
| 3,774,803 | 11/1973 | Bombardier | 280/5 A X |
| 3,777,927 | 12/1973 | Fricker | 220/85 R |
| 3,918,018 | 11/1975 | Tuley et al. | 73/295 X |
| 4,090,525 | 5/1978 | Potter | 137/587 |
| 4,134,416 | 1/1979 | Lallement et al. | 137/590 X |
| 4,142,647 | 3/1979 | Walters | 137/587 X |
| 4,214,767 | 7/1980 | Davies, III | 280/5 A |
| 4,232,874 | 11/1980 | Ystebo | 280/5 A X |
| 4,294,279 | 10/1981 | Wyeth | 137/587 X |
| 4,313,102 | 1/1982 | Broetto | 73/295 X |
| 4,357,027 | 11/1982 | Zeitlow | 280/5 A |
| 4,393,980 | 7/1983 | Armour et al. | 137/587 X |
| 4,401,309 | 9/1983 | Matsuzaki et al. | 280/5 A X |
| 4,416,303 | 11/1983 | Scheurenbrand | 137/576 |
| 4,423,746 | 1/1984 | Scheurenbrand et al. | 137/587 X |
| 4,444,333 | 4/1984 | Anhegger | 137/587 X |
| 4,448,323 | 5/1984 | Hayashi et al. | 280/5 A X |
| 4,449,723 | 5/1984 | Shiratsuchi | 280/5 A X |
| 4,453,724 | 7/1984 | Watanabe et al. | 280/5 A |
| 4,457,443 | 7/1984 | Casimir et al. | 220/85 S |
| 4,469,339 | 9/1984 | Watanabe et al. | 280/5 A |
| 4,480,845 | 11/1984 | Hansen | 280/5 A |
| 4,492,244 | 1/1985 | Chinn et al. | 137/587 X |
| 4,526,286 | 7/1985 | Jung et al. | 280/5 A X |
| 4,531,653 | 7/1985 | Sakata | 137/587 X |
| 4,553,681 | 11/1985 | Heaume | 280/5 A X |
| 4,618,071 | 10/1986 | Vincent | 220/DIG. 27 |
| 4,625,980 | 12/1986 | Lyzohub | 280/5 A |

FOREIGN PATENT DOCUMENTS 2628599 12/1977 Fed. Rep. of Germany .... 220/85 F

Primary Examiner—Alan Cohan
Assistant Examiner—John Rivell

[57] ABSTRACT

A fuel tank construction having a non-vented filler neck and cap, a shut-off valve sealed to the tank by a fluorocarbon bushing, resistant to both alcohol and sunlight, is positioned in the tank such that, upon bushing failure, no more than ten percent of a full fuel tank would leak therefrom, at least one protruberance having an air pocket formed therein and a vent system connected to the protruberance communicating between the air pocket and the atmosphere. The venting system consists of a long plastic tube attached to the vent and routed over the upper surface of the tank having the open end positioned such that any fuel which might discharge through the open end is directed away from the tank and any vehicle it might be attached to. Additionally, a low fuel sensor may also be incorporated and connected to the tank by a similar bushing as that used to connect the shut-off valve. The low fuel sensor utilizes a casing having pin holes surrounding a thermistor. This sensor arrangement reduces the sensitivity of the sensor to sloshing fuel. The shut-off valve and the low fuel sensor are connected to the tank such that no more than ten percent of a full tank is at or above the two bushing connections.

30 Claims, 3 Drawing Sheets

FUEL TANK FOR AN OFF-ROAD VEHICLE

BACKGROUND OF THE INVENTION

The present invention relates to liquid containers and more particularly to a system for virtually eliminating fuel leakage from failed component parts and significantly reducing fuel spillage during normal operations from fuel tanks mounted on small tractors.

In conventional small tractors, the fuel tank was usually positioned between the tractors rear wheels under the rear fender deck. The tank filler neck conventionally protruded above the level of the fender deck and extended at an angle rearwardly away from the operator's seat. These conventional tanks employed vented necks and caps.

Conventionally, the shut-off valve connecting the tank to the engine was located in an area under the fender deck such that approximately ninety percent of the fuel contained in a full tank was above the level of the shut-off valve. This conventional location made servicing the shut-off valve difficult and time consuming. Since the shut-off valve was conventionally attached to the tank by a bushing, bushing failure, due to the shut-off valves location in the tank, allowed up to ninety percent of a full fuel tank to leak therefrom. Further, when servicing the shut-off valve, with the conventional tank construction, it was necessary to either drain the tank or remove the fuel tank from the tractor prior to servicing the shut-off valve. Also during shut-off valve servicing the mesh screen filter, which is part of the conventional shut-off valve assembly, was usually damaged. Finally, because of poor operator accessability due to the shut-off valves conventional location under the rear fender deck, normal operation of the valve was difficult and slow.

Additionally, with conventional fuel tanks, due to operators over filling the tank, significant spillage problems developed. For example, it is well known that increased temperature causes volume expansion of fuel in the tank. Even when the conventional tank is filled to the proper level, it was not unusual with a dramatic temperature change for fuel to flow out of the conventional vented gas cap and filler neck and accumulate on the tank and other tractor surfaces. Even moderate temperature change was sufficient, with an over filled conventional tank, for fuel to flow out of the conventional vented gas tank and filler neck and accumulate on the various tractor surfaces. Occasionally, even with a properly filled tank, and moderate to dramatic temperature change, it was not unusual for fuel to flow out of the cap and filler neck when the vehicle was operating on inclined surfaces. In fact, spillage problems due to over filled tanks and to fuel shifting when operating on inclined surfaces occurred so regularly that a written warning was routinely prominently displayed on the vehicle in near proximity to the conventional tank's filler neck concerning the dangers of spillage from over filling the conventional tank and from inclined surface operations.

Further, utilizing commercially available fuel cans to refuel the tractor, due to the closeness of the conventional gas filler to an attached grass collection system, frequently resulted in fuel spillage.

Additional problems resulting from the conventional small tractor fuel tank construction along with the conventional location of the filler neck has been the difficulty in utilizing a float-fuel gauge. Without reliable fuel level measuring instruments, which are readily viewable by an operator the risk of running out of fuel in the field is greatly increased. Conventionally, if a fuel gauge were provided with the prior art fuel tank configuration, it was normally a float fuel gauge contained in the filter cap which, due to its position, was not readily viewable by an operator sitting in operators seat.

Accordingly, there is a need for a fuel tank construction which, when installed on a small tractors or the like, virtually eliminates fuel leakage from failed components and significantly reduces fuel spillage during normal tractor operation such as during refueling and operating on inclined surfaces thereby preventing fuel from accumulating on tractor surfaces and which provides for a low fuel sensor easily viewable by the operator to positively warn an operator when the level of fuel in the tank reaches a certain level.

SUMMARY OF THE INVENTION

The present invention is a fuel tank construction which virtually eliminates liquid leakage from failed component parts and which significantly reduces fuel spillage from the tank during normal tractor operations thereby preventing fuel from accumulating on tractor surfaces.

Specifically, the present invention provides a fuel tank construction having the shut-off valve located in the top surface thereof above at least ninety percent of the full level of the tank such that upon bushing failure, only ten percent leakage will occur. The bushing is composed of a fluorocarbon, preferrably fluroel FT-2350, commercially available from Minnesota Mining and Manufacturing Company, which exhibits superior characteristics when exposed to both alcohol and sunlight.

A notch is provided in the rear steel fender deck of the tractor which allows easy access to a shut-off valve for servicing thereof. With this construction, the shut-off valve can be removed from the tank without the necessity of draining or removing the fuel tank from the tractor.

A short, non-vented, large diameter filler neck having an associated non-vented cap is positioned under the tractor operators seat so that an operator is able to accurately fill the fuel tank without interference from an attached grass collection system.

Air pockets are provided by protuberances formed in the tank which allow for fuel expansion and for fuel shifting during normal tractor operations on inclined surfaces.

A venting system is incorporated into the tank which communicates between the atmosphere and at least one of the air pockets. A porous material or filter is positioned inside the tank where the vent system is connected to the tank for reducing the force with which the liquid in the tank enters the venting system.

Additionally, a low fuel sensor may be operatively positioned in the fuel tank utilizing a second bushing preferably of the same design and same material as the bushing utilized to connect the shut off valve to the tank. The low fuel sensor has a visual warning element readily viewable by the operator for warning the operator when the fuel in the tank reaches a predetermined level.

The primary object of this invention, therefore, is to provide a liquid container or fuel tank construction which virtually eliminates fuel leakage from failed tank components especially bushings; which significantly reduces fuel spillage during normal operations of a tractor both during refueling operations and when operating on inclined surfaces; which significantly reduces fuel spillage due to fuel expansion; which significantly reduces spillage during refueling operations; which prevents or significantly reduces fuel from accumulating on the tank surface and other tractor surfaces due to fuel leakage or spillage therefrom; which provides for easy access for both operating and servicing the tank shut-off valve; which provides an easily viewable, accurate low fuel sensor operatively attached to the tank by a bushing for warning the operator in the event of low fuel; and which provides for economy of manufacture and assembly of the tank.

Other objects and advantages of the invention will be apparent from the following description, accompanying drawings and the appended claims.

DESCRIPTION OF THE PREFERRED EMBODIMENT

Figure 1:
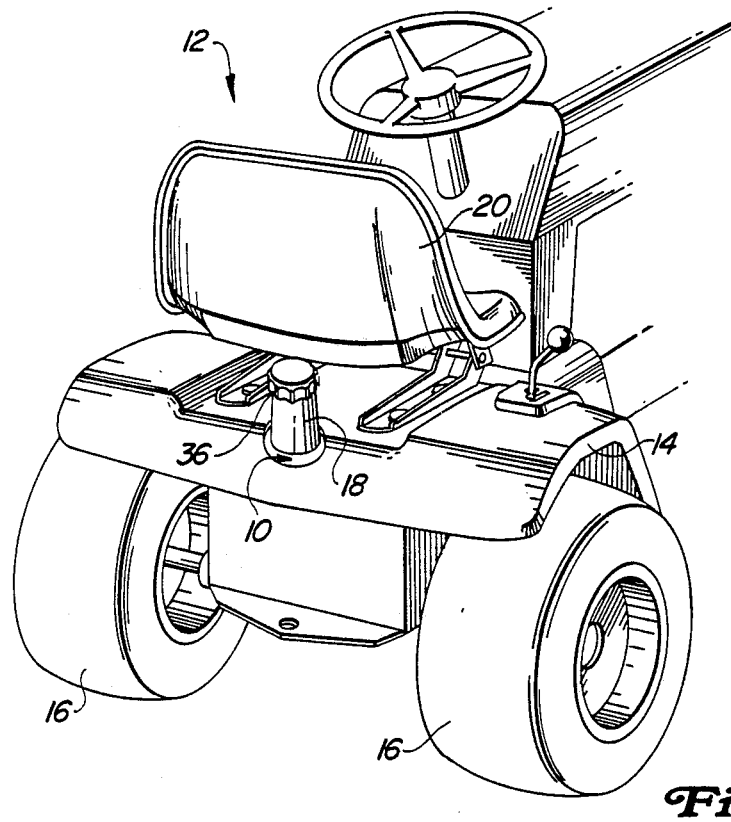
FIG. 1 is a perspective view illustrating a prior art fuel tank mounted on a small tractor.

As illustrated in FIG. 1, a prior art conventional fuel tank, generally designated as 10, is illustrated mounted on a small tractor 12. As clearly shown, the tank is mounted under a fender deck 14 over the rear wheels 16 of the tractor 12. The prior art tank 10 has a filler neck 18 extending through the fender deck upwardly above the fender deck and rearwardly away from the operator's seat 20.

Figure 2:
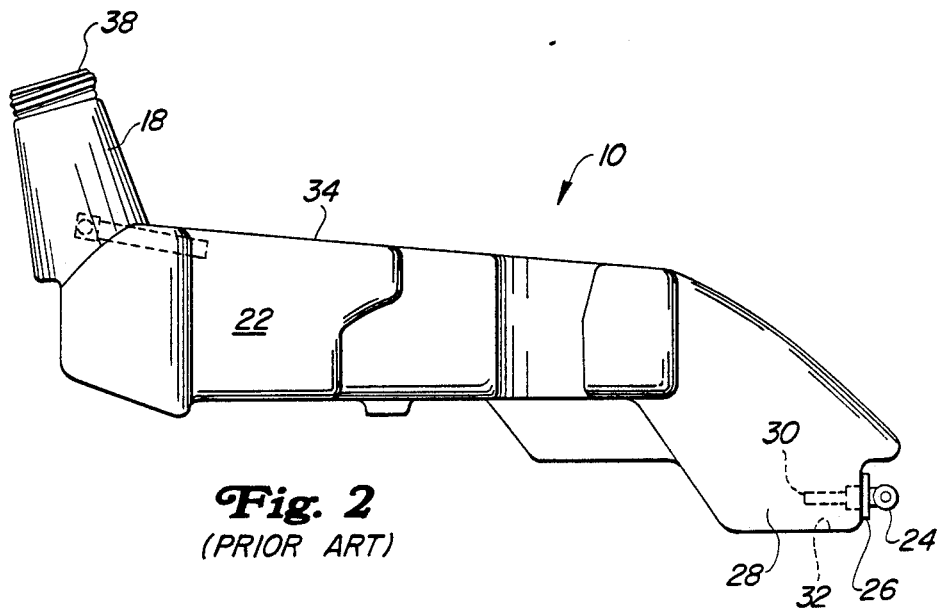
FIG. 2 is a partial perspective view of a prior art fuel tank construction of FIG. 1 illustrating the conventional construction of the shut-off valve and filler neck.

As illustrated in FIG. 2, conventional fuel tank 10 includes a body 22 having a shut-off valve 24 connected to one end of the tank by a bushing 26 and with the filler neck 18 being at the other end of the tank. In the conventional design, the shut-off valve 24 is located in a portion 28 of the tank so that fuel can be drawn into the shut-off valve through filter 30 near the lowermost point 32 of the tank.

Filler neck 18 extends above an upper surface 34 and protrudes at an angle away from the front portion 28 of the tank. A cap 36 (see FIG. 1) closes the upper end 38 of filler neck 18 and may contain conventional means for measuring (not shown) the fuel level contained in the tank. The cap and the filler neck are conventionally vented.

If an operator were to fill the tank 10 to a level well up into filler neck 18 near the upper end 38, there would be no room for fuel expansion. Thus, upon thermal expansion of the fuel contained therein, fuel would flow out either or both the vented neck 18 and vented cap 36. Additionally, due to the position of the shut-off valve 24 upon failure of bushing 26, if the tank were full, considerable fuel could leak before the bushing is repaired. Further, since the shut-off valve 24 and bushing 26 are normally located in an inaccessable area underneath the fender deck 14 of the tractor 12, the tank 10 would conventionally have to be removed from the tractor in order to repair the bushing 26 or to service the shut-off valve 24. In fact, in the conventional location, operation of the shut-off valve 24 is extremely difficult due to its relative inaccessibility under the fender deck 14.

Figure 3:
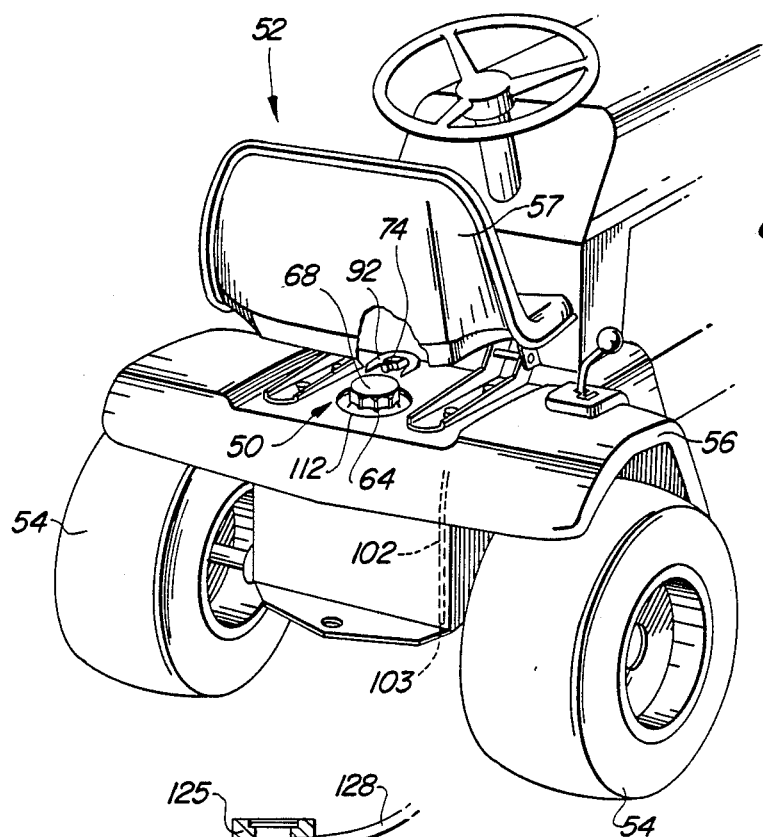
FIG. 3 is a perspective view illustrating the fuel tank of the present invention mounted on a small tractor.
Figure 4:
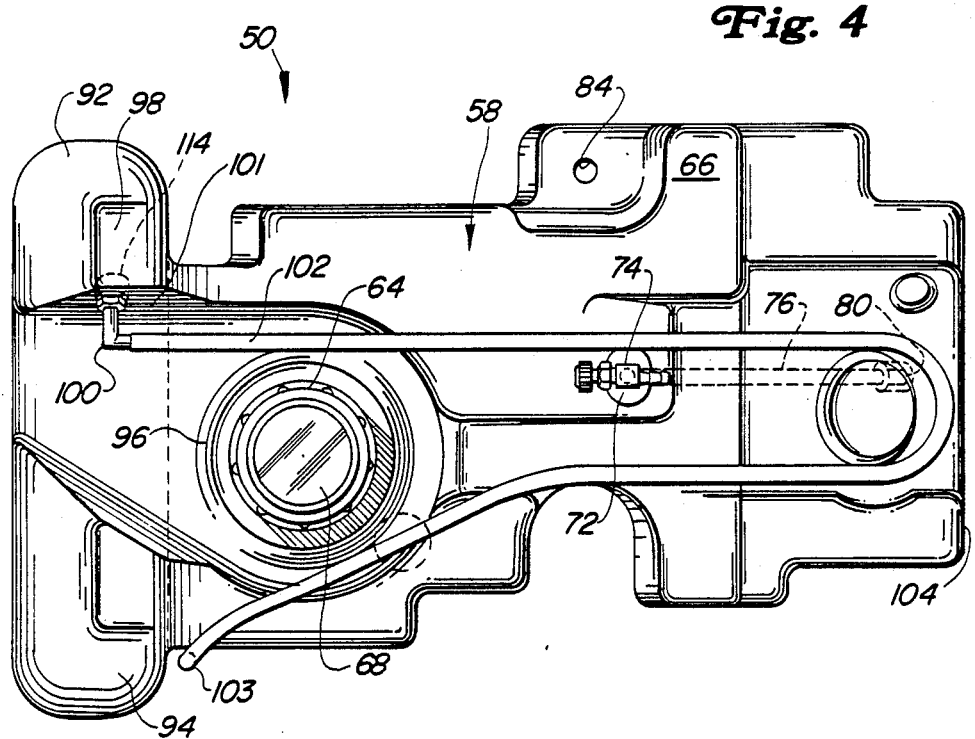
FIG. 4 is a top view of the fuel tank construction of the present invention.
Figure 5:
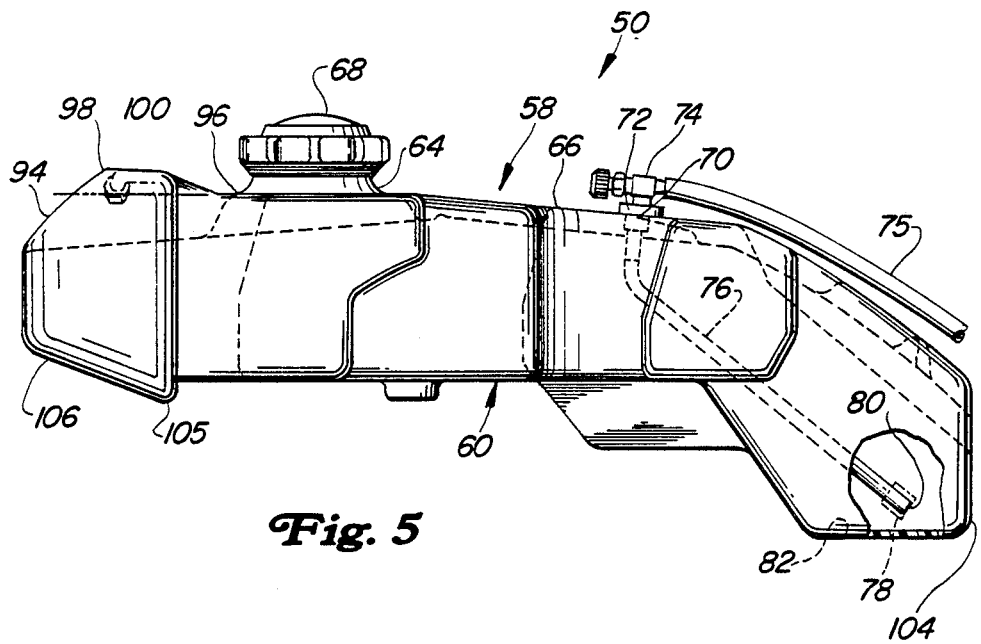
FIG. 5 is a side view of the fuel tank construction of the present invention.

In the preferred embodiment of the present invention as shown in FIGS. 3-5, a fuel tank 50 is attached to a small off-road vehicle such as a small tractor 52 approximately midway between the rear wheels 54 and underneath a rear fender deck 56 immediately below an operator seat 57. The fuel tank 50 is preferably produced by a conventional blow modling process. The tank is preferably mnaufactured as one integral molded unit, but could be conventionally manufactured in any number of component parts and then conventionally joined together to form a single unit. For convenience, the preferred integral tank 50 will be described as having an upper or top portion 58 and a lower or bottom portion 60.

As shown in FIGS. 4 and 5, the top portion 58 has a short, large diameter, non-vented filler neck 64 integrally formed therein on the top surface 66 thereof. A non-vented cap 68 is provided for selectively engaging the filler neck 64 in order to selectively open the neck 64 during refueling operations. Since the present invention will not function properly unless a non-vented cap is utilized to close the non-vented filler neck, both the filler neck and cap thread and size are designed such that conventional vented caps can not be used with the fuel filler neck of the fuel tank of the present invention.

An aperture 70 is provided in the top surface 66 for receiving a bushing 72 and a shut-off valve 74. The shut-off valve 74 is of conventional construction and provides for selective communication between the fuel tank 50 and an engine (not shown) via a conventional hose 75. Attached to the shut-off valve 74 and located inside the fuel tank is a tube 76, preferably plastic, for drawing fuel from the tank through the shut-off valve to the engine (not shown). The tube 76 could consist of rubber or any flexible material which allows end 80 to be accurately positioned inside the tank.

In the preferred embodiment, a fuel filter is not considered operationally necessary. However, if one is employed, then a conventional fuel filter 78 (shown in phantom) is connected to tube end 80. The fuel filter's weight may assist in maintaining the tube 76 with the fuel filter 78 attached thereto proximate the inner surface 82 of the lower portion 60 of the fuel tank. As shown in FIG. 4, a second aperture 84 for optionally mounting a low fuel sensor, discussed in detail below, is also provided in the top surface 66 of the upper portion 58. During the molding process, aperture 84 is preferably formed in each tank 50. Alternatively, if not formed during the molding process, aperture 84 could be created in upper surface 66 by drilling, punching, etc. if a fuel sensor were required.

With reference to FIGS. 4 and 5, air pockets are formed inside protuberances 92, 94 in upper portion 58. As shown in FIG. 4, the full level 96 of the fuel tank is below the uppermost point 98 of the two protuberances 92, 94 thereby providing the air pockets inside the tank which allows for fuel expansion and shifting.

A vent 100 is connected to the tank 50 on the interior side 101 of protuberance 92. A tube 102, preferably plastic although rubber and other flexible synthetic material may be used, is connected thereto and is positioned contiguous with the outer surface 66 of the upper portion 58 of the fuel tank 50. The particular orientation of tube 102 relative to vent 100 provides additional fuel spillage protection. Specifically, since the length of the tube 102 from vent 100 to the tube end 103 is considerable, any fuel which might normally escape the tank through the vent 100 into the tube 102 by fuel expansion or shifting will usually be pulled back into the tank by the engine prior to the fuel in tube 102 reaching tube end 103 and thus preventing fuel from spilling out. SInce there is always the possibility that fuel spilling over into tube 102 may not be drawn back into the tank by engine suction, tube 102 extends over the upper surface 66 of the tank from vent 100 in protrusion 92, around neck 64 and shut-off valve 74 to end 104 and then loops back along upper surface 66 such that tube tip 103 is arranged such that any liquid which escapes the tube will be directed away from any tank or vehicle surface without any liquid spillage contacting the vehicle's components or accumulating thereon. This prevents potentially dangerous fuel pools from accumulating on the tank or vehicle.

The tank 50, as illustrated in FIGS. 3 and 4, is shaped and sized for installation on a particular small tractor. However, it should be understood that the tank can be shaped and sized to fit into the appropriate area of an off-road vehicle.

As shown in FIGS. 3–5, when mounted on the tractor 52, the fuel tank 50 of the present invention has a generally horizontal configuration with lowest surface 82 of one end portion 104 extending below the lowest portion 105 of the other end portion 106. The tube 76 attached to the shut-off valve 74 extends diagonally from the shut-off valve down into the interior of end portion 104. Since end portion 104 of the tank is the lowest portion with respect to the horiztonal, as fuel is drawn from the tank 50, the fuel level will normally empty from portion 106 first with fuel remaining in portion 104 until most all the fuel in the tank is withdrawn therefrom via tube 76 and shut-off valve 74.

As illustrated in FIG. 3, it can be seen that when installed on the tractor 52, an operator need only raise the seat 57 for easy access to both the filler neck 64 and cap 68 and the shut-off valve 74. The fender notch 92 provides for easy access to the shut-off valve 74 for both operation and servicing thereof. An aperture 112 in the fender deck 56 under the operators seat 57 provides easy operator access to the fuel tank cap 68 and filler neck 64.

During refueling operations, an operator removes the cap 68, inserts a commercial fuel can nozzle (not shown) or a conventional fuel pump nozzle (not shown) and introduces fuel to the desired full level 96. Due to the location and construction of the filler neck 64 in the center of the fender deck 56 under the operator seat 57 relatively removed from the rear end of a tractor having an attached grass collection system (not shown), easy operator access to the fuel tank filler neck 64 provides for accurate spill-free refueling.

Once the fuel tank 50 has been filled to the full line 96, during normal tractor operations, fuel is pulled from the fuel tank through the tube 76 and if so equipped, optional fuel filter 78, into the shut-off valve 74 and subsequently to the engine (not shown). As the fuel in the fuel tank is consumed by the engine, the fuel level in the tank decreases from top to bottom and from left to right, as seen in FIG. 5.

In the event of extreme temperature changes, the air pockets in protuberances 92, 94 allow for fuel expansion therein and the non-vented cap 68 and filler neck 64 prevent fuel spillage therefrom. Since the filler neck 64 and the cap 68 are non-vented, excess vapor fumes and/or fuel are diverted by the vent 100 to the tube 102 connecting the vent to the atmosphere. As the tractor 52 is operated on inclined surfaces, fuel in the tank will shift accordingly. Again, since the filler neck 64 and the cap 68 are non-vented, as the fuel shifts, there will be no leakage or spillage therefrom. Additionally, due to the air pockets constructed in the tank, and the venting system attached thereto, little, if any, fuel spillage is experienced. Specifically, because the vent 100 has the tube 102 attached thereto and the tube 102 extends from the vent 100 over the outer surface 66 of the upper portion 58 of the fuel tank 50 toward the front of the tank and loops back again to a location where the end 103 directs any excess fuel away from the tank and other tractor surfaces, if fuel were to be forced from the tank through the vent 100 into the tube 102, the tube 102 is of sufficient length to prevent virtually any liquid spillage from tube end 103. Fuel which enters the vent and subsequently the tube connected thereto would normally gravitate or be drawn back into the tank by the engine before it could travel the entire length of the tube and spill from the tube. Additionally, the force of any sloshing fuel which may enter the venting system is dissipated by a fibrous material filter 114 covering the junction of the vent 100 into the tank 50.

Figure 6:
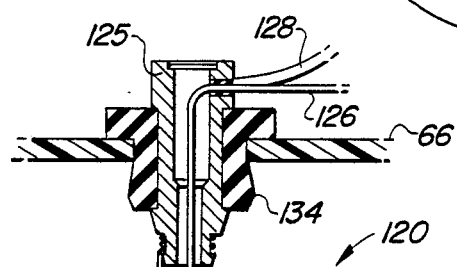
FIG. 6 is a partial sectional view of a low fuel sensor of the present invention assembled to the fuel tank.
Figure 6:
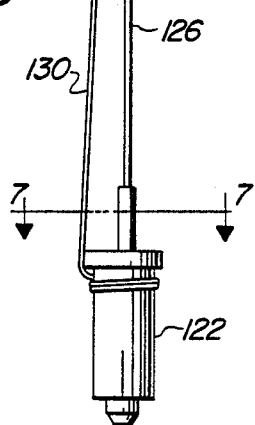
Figure 7:
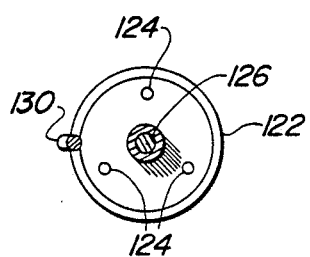
FIG. 7 is a top view of the low fuel sensor taken along line 7—7 of FIG. 6.

As shown in FIG. 6, a low fuel sensor 120 is provided for warning the operator when fuel contained in the tank 50 is at or below a predetermined level. The low fuel sensor 120 consists of a conventional thermistor enclosed in a casing 122 having pin holes 124 in both the top and bottom surfaces thereof and a member 125 for housing and receiving the necessary electrical wires 126, 128 which connects the thermistor to the warning light on the tractor dash (not shown). A spring 130 is utilized to adjust the casing 122 at the optimum depth in the tank.

A second flurocarbon bushing 134 is utilized for assembling the low fuel sensor 120 to the fuel tank 50. The bushing 134 is preferably constructed in the same configuration as bushing 72 used to connect the shut-off valve 74 to the tank. Both bushings are preferable constructed of fluorel FT-2350 or an equivalent thereof, which is resistant to deterioration from exposure to both alcohol and sunlight.

It should be appreciated that while it is preferred to manufacture the tank with two apertures, one for the shut-off valve and one for the low fuel sensor, it is possible to manufacture the tank without the low fuel sensor aperture if the low fuel sensor is not utilized with the tank.

When utilized as an option, low fuel sensor 120 is assembled in the tank via aperture 72. Bushing 134 containing the sensor 120 is preferrably press fitted into the aperture 72. When not utilizing the low fuel sensor 120, a plug configured similarly to member 125 is inserted into bushing 134 and the unit is inserted into aperture 72.

As shown in FIGS. 5 and 6, during the operation of the tractor 52, the fuel in tank 50, moves from left to right and from top to bottom. As long as fuel contacts the thermistor in casing 122, a minute amount of current is sent to the low fuel lamp on the dash (not shown). This current is not sufficient to illuminate the low fuel lamp. As the fuel in the tank reaches a level where it no longer contacts the thermistor, the thermistor heats up dramatically increasing the current. This increased current is more than adequate to illuminate the low fuel lamp on the dash thus providing a visual warning to the operator that the level of fuel in the tank has reached a predetermined point. With this visual warning, with a properly adjusted sensor, an operator will have ample time to transport the tractor to a refueling location.

The pin holes 124 in casing 122 allow the amount of fuel contacting the thermistor inside the casing 122 to remain rather constant and relatively unaffected by the shifting and sloshing of fuel within the tank. This design, which utilizes spring 130 to accurately locate the casing 122 inside tank 50, provides an accurate measurement of the fuel remaining in the tank. With this construction, sloshing or shifting of fuel within the tank will have very little affect on the accuracy of the low fuel sensor.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A fuel tank having an upper and a lower surface operatively positioned on a vehicle having an engine and an operator seat comprising: filler means, operatively positioned in said tank, for introducing fuel into said tank such that during refueling operations, little if any fuel is spilled from said tank onto said tank surfaces or said vehicle;
    cap means, operatively selectably attachable and detachable to said filler means, for selectively closing and opening said filler means such that, when said filler means is selectively closed, no fuel is spilled therefrom;
    valve means, operatively positioned in said upper surface of said tank, for controlling the flow of fuel therefrom;
    seal means, operatively connecting said valve means to said tank, for sealing said valve means to said tank;
    expansion means, operatively connected to said upper surface of said tank, for permitting expansion of said fuel therein;
    vent means, operatively connected to said expansion means, for venting said tank; and
    first conduit means, operatively connected to said vent means, for receiving fuel from said expansion means, said first conduit means being positioned at least particlally contiguous with said upper surface such that no fuel contacts or accumulates on any surface of said fuel tank.

2. The tank of claim 1 further comprising:
    sensor means, operatively positioned in said tank, for indicating when said liquid contained in said tank is at or below a predetermined level.

3. The tank of claim 2 wherein said sensor means further comprises:
    a low fuel sensor operatively connected to said upper surface of said tank by a bushing.

4. The tank of claim 3 wherein said bushing is composed of a flurocarbon resistant to deterioration from exposure to both alcohol and sunlight.

5. The tank of claim 4 wherein said fluorocarbon is fluorel FT-2350.

6. The tank of claim 5 wherein said low fuel sensor further comprises:
    a casing having a thermistor operatively positioned therein such that when said fuel contacts said thermistor, a minute amount of current is produced thereby, and when said thermistor is not contacted by said fuel, an increased amount of current is produced thereby; and
    means, operatively connected to said thermistor, for communicating said current produced by said thermistor to a low fuel warnaing light positioned on said vehicle and being observable by an operator positioned in said operator seat.

7. The tank of claim 6 wherein said fuel sensor further comprises:
    means for preventing fuel sloshing in said tank from prematurely illuminating said warning light.

8. The tank of claim 7 wherein said preventing means further comprises:
    apertures formed in said casing.

9. The tank of claim 1 wherein said valve means further comprises:
    a shut-off valve; and
    second conduit means, operatively attached to said shut-off valve, for transferring fuel from said tank through said shut-off valve to said engine.

10. The tank of claim 9 wherein said second conduit means comprises:
    a tube having a first end operatively connected to said shut-off valve and a second end operatively positioned proximate a bottom surface of said tank.

11. The tank of claim 10 wherein said second conduit means further comprises:
    a fuel filter attached to said second end of said tube.

12. The tank of claim 11 wherein said fuel filter is attached to said tube such that said tube is maintained proximate said bottom surface.

13. The tank of claim 1 wherein said seal means further comprises:
    a flurocarbon bushing resistant to deterioration from exposure to both alcohol and sunlight.

14. The tank of claim 13 wherein said flurocarbon is fluorel FT-2350.

15. The tank of claim 1 wherein said filler means further comprises:
    a non-vented filler neck including means for indicating a full tank operatively positioned thereon.

16. The tank of claim 15 wherein said expansion means further comprises:
    at least one protuberance formed on the upper surface of said tank for providing an air pocket in said tank, said protuberance being at least partially located above said full tank indicating means.

17. The tank of claim 15 wherein said cap means further comprises:
    a non-vented cap.

18. The tank of claim 17 wherein said filler neck and said cap are uniquely sized and threaded to said tank such that no cap other than non-vented caps are attachable to said non-vented neck.

19. The tank of claim 1 wherein said first conduit means further comprises:
    a tube operatively connected at a first end to said vent means for receiving fuel from said expansion means through said vent means, said tube being of sufficient length to significantly reduce fuel spillage from said tank via said vent means.

20. The tank of claim 19 wherein said tube is arranged on said tank such that said tube directs any fuel expelled therefrom away from said tank and said vehicle such that said expelled fuel does not contact said tank or said vehicle.

21. The tank of claim 20 wherein said vent means further comprises:
a filter, operatively positioned inside said expansion means and covering said vent means for reducing the force of any fuel moving from said expansion means into said tube through said vent means.

22. The tank of claim 20 wherein said tube extends from said vent means towards the end of said upper portion most remote from said vent means, said tube reversing direction and extending back toward said vent means and extending below the lowermost surface of said tank such that any fuel exiting said tube is directed away from all surfaces of said tank and said vehicle.

23. The tank of claim 1 wherein said first conduit means is operative to minimize fuel leakage from said tank when said tank is oriented upside down.

24. The tank of claim 1 wherein said seal means is connected to said upper surface of said tank such that upon the failure of said seal means, no more than ten percent of said fuel contained in said tank would leak therefrom due to said failure.

25. A fuel tank mounted on a tractor having an engine and a front and rear axle, said tank comprising:
an upper portion having an inner and an outer surface, said upper portion having at least one protuberance, said protuberance having a first aperture for communication with the atmosphere formed therein, said upper portion having a non-vented filler neck operatively positioned therein for introducing fuel into said tank;
a lower portion having an inner and outer surface and being operatively connected to said upper portion;
a shut-off valve operatively postioned in said upper portion;
a flurocarbon bushing, resistant to exposure to both alcohol and sunlight, for sealingly connecting said shut-off valve to said tank utilizing an second aperture formed in said upper portion;
conduit means, operatively attached to said shut-off valve, for transferring fuel from said tank to said engine through said shut-off valve;
vent means, operatively attached to said first aperture, for venting said tank; and
a tube, operatively connected to said vent means and extending along said outer surface of said upper portion from said vent means, for minimizing fuel spillage from said tank, said tube extending over said outer surface of said upper portion away from said vent means and toward the end of said upper portion most remote from said protuberance, said tube then reversing direction to a position where any fuel exiting said tube is directed away from said tank and said tractor such that no fuel expelled from said tube contacts any surface of said tank or said tractor.

26. The tank of claim 23 further comprising:
filter means, operatively attached to said conduit means, for filtering the fuel entering said conduit means and for maintaining a first end of said conduit means proximate said inner surface of said lower portion of said tank.

27. The tank of claim 26 wherein said conduit means further comprises:
a plastic tube extending from said shut-off valve toward said inner surface of said lower portion.

28. The tank in claim 27 wherein said filter means further comprises:
a conventional fuel filter operatively attached to said first end of said tube.

29. The tank of claim 28 wherein said vent means further comprises:
a fiberous filter, operatively positioned in said tank and covering said aperture, for reducing the force of but not preventing said fuel from moving from said tank through said filter and into said tube.

30. A system for virtually eliminating fuel leakage and significantly reducing fuel spillage from a fuel tank mounted on a tractor having a front and a rear axle, said system comprising:
a blow molded fuel tank having upper and lower surfaces operatively mounted over said rear axle of said tractor;
a shut-off valve having a sealing means resistant to both alcohol and sunlight, operatively positioned in said upper surface such that if said sealing means should fail, any resulting leakage therefrom is minimized, said position of said valve in said tank being such that operation and servicing of said shut-off valve is enhanced thereby;
a non-vented filler neck integrally formed with said upper surface and being selectively opened and closed by a non-vented cap;
at least one protuberance in said upper surface for forming an air pocket such that when said tank is properly filled with fuel, air will remain in said protuberance;
vent means formed in said protuberance; and a tube, operatively connected to said vent means, for minimizing fuel spillage from said tank, said tube extending along said upper surface of said tank away from said vent means toward the end of said upper surface most remote from said vent means, said tube reversing direction and extending to a position where any fuel exiting said tube is directed away from all surfaces of said tank and said tractor.

* * * * *